US005134606A

United States Patent [19]

Sekiguchi et al.

[11] Patent Number: 5,134,606

[45] Date of Patent: Jul. 28, 1992

[54] METHOD AND OPTICAL RECORDING/REPRODUCING APPARATUS FOR OPTIMIZING LASER BEAM POWER

[75] Inventors: Toru Sekiguchi; Yoshihiro Sasaki, both of Tokyo, Japan

[73] Assignee: NEC Corporation, Tokyo, Japan

[21] Appl. No.: 549,986

[22] Filed: Jul. 9, 1990

[30] Foreign Application Priority Data

| | | | |
|---|---|---|---|
| Jul. 7, 1989 | [JP] | Japan | 1-174110 |
| Sep. 5, 1989 | [JP] | Japan | 1-230807 |
| Sep. 28, 1989 | [JP] | Japan | 1-250744 |

[51] Int. Cl.[5] ..................... G11B 7/00

[52] U.S. Cl. ..................... 369/116; 369/54; 369/56; 369/48

[58] Field of Search ..................... 369/116, 121, 122, 50, 369/53-57, 100, 47, 48, 13, 43, 44.38; 366/114; 250/205

[56] References Cited

U.S. PATENT DOCUMENTS

| | | | |
|---|---|---|---|
| 4,769,802 | 9/1988 | Tatsduguchi | 369/44.38 |
| 4,866,692 | 9/1989 | Saito et al. | 369/116 |
| 4,982,389 | 1/1991 | Nakao et al. | 369/116 |
| 4,982,397 | 1/1991 | Yokota | 369/116 |
| 5,005,164 | 4/1991 | Sakamoto et al. | 369/116 |

*Primary Examiner*—Roy N. Envall, Jr.
*Assistant Examiner*—Thang V. Tran
*Attorney, Agent, or Firm*—Sughrue, Mion, Zinn, Macpeak & Seas

[57] ABSTRACT

An apparatus and method for recording and reproducing information onto or from a rotating magnetooptic disc such that optimal laser power is maintained throughout the recording process. A test recording laser beam undergoes stepwise power changes as the recording position along a track of the disc changes. The recording signal is read out by a reproducing mechanism corresponding to the stepwise power change. A correcting mechanism utilizes the read-out signal to obtain the optimal power of the recording laser beam. Then, routine recording is carried out utilizing the optimal laser power. As routine recording is carried out, the optimal laser power is corrected depending upon the radial distance of the track being recorded from the center of the disc. As a result, optimal laser power is maintained regardless of the track position on the magnetooptic disc.

12 Claims, 4 Drawing Sheets

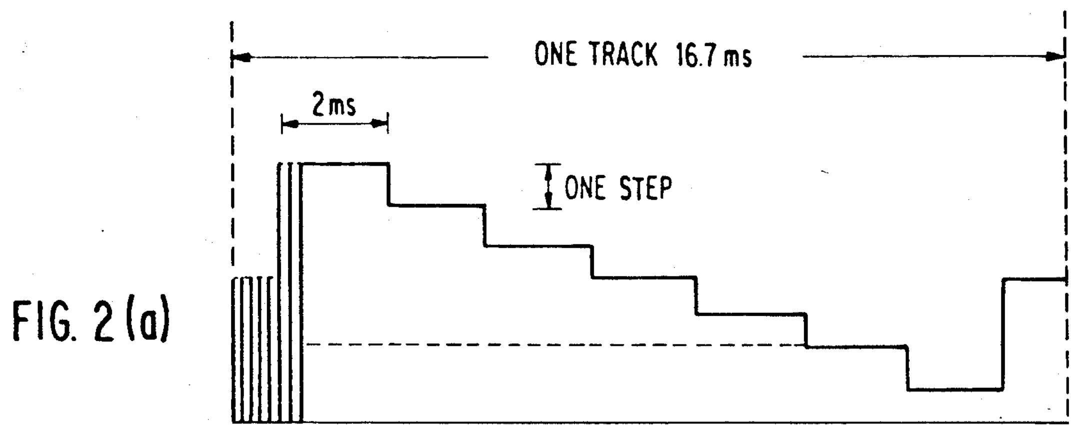
FIG. 2(a)
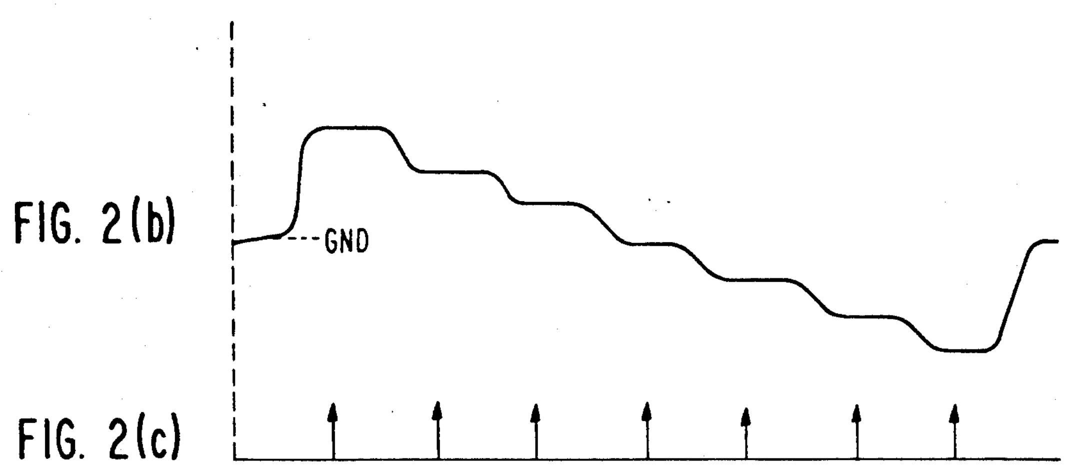
FIG. 2(b)
FIG. 2(c)
FIG. 3(a)
LOW POWER
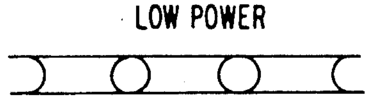
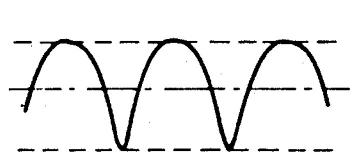
FIG. 3(b)
OPTIMAL POWER
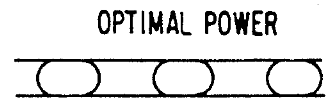
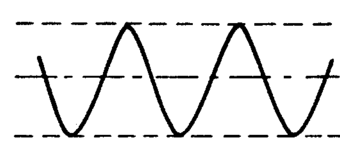
FIG. 3(c)
HIGH POWER
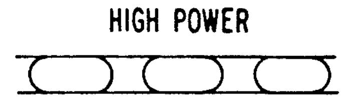
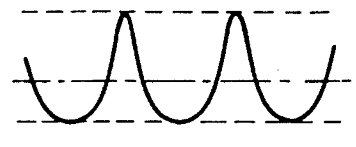

METHOD AND OPTICAL RECORDING/REPRODUCING APPARATUS FOR OPTIMIZING LASER BEAM POWER

BACKGROUND OF THE INVENTION

This invention relates to an optical recording/reproducing apparatus and more particularly, to a magnetooptic recording/reproducing apparatus which records or reproduces an information signal by a laser beam onto or from a rotating magnetooptic disc.

In the magnetooptic recording/reproducing apparatus of this type, there exists an optimal intensity (power) of a recording laser beam which is determined in accordance with a characteristic of an applied disc, and therefore it is significant to find the optimal laser power. One of the prior art techniques to learn an optimal laser power is to find the power experimentally in advance. Another prior approach is to employ recording and reproducing laser beams which are arranged to read out an information signal immediately after recording to evaluate the quality of the read out information signal and, thus, to control the power of the recording laser beam at an optimal level in a feedback manner. (See, for example, Japanese Open-Laid Patent 63-56822.)

However, the former approach is not practical because an optimal laser power differs disc by disc and discs have some aging characteristics. This technique is especially impractical in applying to the apparatus which rotates a magnetooptic disc at a given angular speed for recording/reproducing so that the line velocity is varied between an inner side track and an outer side track on a disc due to difference in radial distance because a received laser power level on the disc changes with a change in radial distance. The drawback of the latter technique, although it can achieve the optimal laser beam power succesively, is to require an optical head which can emit the recording and reproducing laser beams simultaneously, together with complicated arithmetic processing, resulting in pushing up the production cost.

SUMMARY OF THE INVENTION

Accordingly, an object of this invention is to provide a magnetooptic recording/reproducing apparatus having a simple structure, which is capable of recording information with the recording laser beam having an optimal power irrespective of a track position on a magnetooptic disc.

According to the present invention, there is provided a magnetooptic recording/reproducing apparatus, comprising means for recording for one track a recording signal with a recording laser beam of which power changes stepwise, means for reading out the recording signal corresponding to the stepwise changed power, means for obtaining an optimal power level of the recording laser beam by evaluating the read-out signal, means for recording an information signal by utilizing thus obtained optimal recording beam power from the track, and means for correcting the recording laser beam power correspondingly to the shift of a recording position on a disc.

Moreover, according to the present invention, if the optimal recording laser beam power cannot be obtained, by varying the power level of the recording signal at the initial step, the optimizing process to obtain an optimal recording laser beam power is repeated.

BRIEF DESCRIPTION OF THE DRAWINGS

FIG. 2(*a*) shows a waveform of a recording signal having a stepwise changed power according to the present invention;

FIG. 2(*b*) shows a waveform of an error output delivered from an error amplifier in FIG. 1;

FIG. 2(*c*) shows sampling times for sampling the error output shown in FIG. 2(*b*);

FIGS. 3(*a*), 3(*b*) and 3(*c*) are charts to show relationships among various recording laser beam powers, pit states formed on a disc and reproduced signals;

DESCRIPTION OF THE PREFERRED EMBODIMENT

Figure 1:
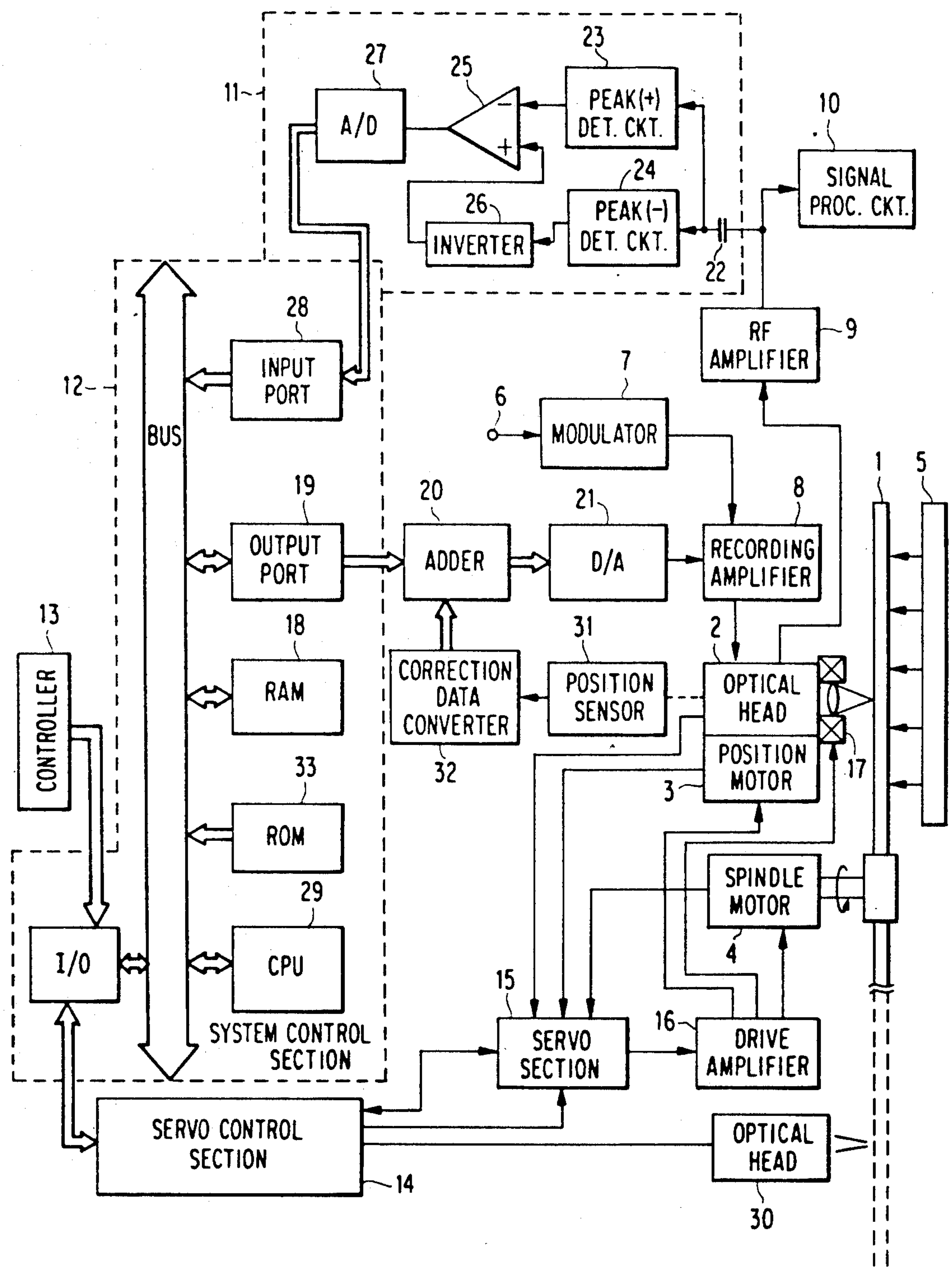
FIG. 1 is a block diagram of an embodiment according to the present invention.

Referring now to FIG. 1, an embodiment of the present invention comprises a magnetooptic disc 1, an optical head 2 which contains a laser diode to emit a laser beam onto the disc 1 in order to record or reproduce an information signal, a positioner motor 3 which moves the optical head 2 to a designated position in the radial direction of the disc 1, a spindle motor 4 which turns the disc 1, and a magnetic field generator 5 which provides an auxiliary magnetic field to the disc 1. A video signal as the information signal to be recorded is inputted to a modulator 7 via a terminal 6 to be subjected to a prescribed modulation, and then supplied to the optical head 2 via a recording amplifier 8. In a reproducing operation, a reproduced signal from the head 2 is supplied to a signal processing circuit 10 via an RF amplifier 9. The output from the RF amplifier 9 is also fed to an evaluation circuit 11 which evaluates suitability of recorded pits on the disc 1, i.e., suitability of the reproduced signal. The output from the evaluation circuit 11 is fed to a system control section 12. The evaluation circuit 11 will be described hereinafter in detail.

The system control section 12 controls the apparatus of the embodiment as a whole based on an input command from a controller 13, and computes an optimal intensity (power) of the recording laser beam so as to control an amplifying factor of the recording amplifier 8. A servo control section 14 is connected to the system control section 12 via an I/O and receives instructions from the control section 12 in order to execute operation designated by the controller 13. The servo control section 14 also receives a tracking error signal and a focus error signal from the optical head 2 and, thus, controls the positioner motor 3, the spindle motor 4 and a coil actuater 17 mounted on the optical head 2 via a servo section 15 and a drive amplifier 16 to perform the designated operation.

Optimization process of the recording laser beam power according to the present invention will now be described. When recording operation is designated by the controller 13, recording usually begins from a track which is preset. In the present invention, the operation for obtaining the optimal laser beam power is initially conducted whenever the recording operation begins. More particularly, under the control of a CPU 29, the system control section 12 outputs to an output port 19 power data which stepwise changes in seven stages on the basis of an initial data. The initial data is stored in advance in a read only memory (ROM) 33 and transferred into a random access memory (RAM) 18 when the apparatus of the embodiment is energized. The power data from the output port 19 is added by an adder 20 to correction data (to be described in detail hereinafter) which is determinable depending on a position of the optical head 2, i.e., a track position on the disc, the sum of which is sent to a D/A converter 21 and converted into an analog signal. The analog signal from the D/A converter 21 is supplied to the recording amplifier 8 where the modulation signal from the modulator 7 is amplified up to this added power data level and supplied to the optical head 2. FIG. 2(*a*) shows a recording signal outputted from the recording amplifier 8 wherein an NRZ (non return to zero) code input signal is modulated by the modulator 9 into an NRZI (non return to zero inverted) code recording signal. As shown in FIG. 2(*a*), the recording signal has seven amplitudes stepwise changed for one track. The repetitive frequency of the recording signal corresponding to the data transfer rate is about 50 MHz in this embodiment. Further, in this embodiment, respective recording tracks on the disc have a period of about 16.7 ms. The recording signal changes for every period of about 2 ms, and has a step size of about 0.4 mW. The magnetooptic disc 1 rotates at the rate of 3,600 rpm. For the optimization process, any signal as the modulation signal may be supplied to the terminal 6 because the content of the modulation signal is not related to the optimization process. When the system control section 12 sends the power data which stepwise changes in the seven steps to the output port 19, the seven power data corresponding to the respective steps are stored into another memory area of the RAM 18.

As described in the above, after the recording for one track with the seven power changes is completed, reading operation with respect to this track starts. To this end, the servo control section 14 brings back the optical head 2 to the starting point of this track, and the track is scanned with a reading laser beam having a given power which is weaker than that of the recording laser beam. A reproduced signal having a level corresponding to the magnetization state on the disc is picked up by the optical head 2 and amplified by the RF amplifier 9 to be supplied to the evaluation circuit 11. At the circuit 11, the reproduced signal is sent to positive and negative peak detection circuits 23 and 24 via a capacitor 22, and positive and negative peaks are detected, respectively. An error detection amplifier 25 outputs the difference between the positive and negative peaks. For this purpose, an inverter 26 is inserted between the negative peak detection circuit 24 and the error detection amplifier 25. The error output from the error detection amplifier 25 is converted into digital data by an A/D converter 27, and supplied to the system control section 12 via an input port 28.

FIGS. 3(*a*), (*b*) and (*c*) are charts showing the relationships of the recording laser beam power, the pit state formed on the disc surface and the reproduced signal. FIG. 3(*a*) shows the case where the recording laser beam power is low, FIG. 3(*b*) where the recording laser beam power is at an optimal level, and FIG. 3(*c*) where the recording laser beam power is excessive. The recording signal of the NRZI code is classified as a mark length recording method and, therefore, the harmonic distortion changes depending on the recording laser beam power. If the recording laser beam power is optimal, the harmonic distortion becomes minimal (about −40 dB). At this time, the average value of the reproduced signal coincides with the center level in the amplitude thereof. But if the power is smaller or greater than the optimal level, the average value of the reproduced signal does not coincide with the center level. This means that even harmonic distortion occurs and the average value of the reproduced signal would include a direct current component corresponding to the even harmonic distortion.

Accordingly, the error output from the error detection amplifier 25 of FIG. 1 would represent the difference in the positive and negative amplitudes as against the average value of the reproduced signal, and when the difference signal reaches zero, the recording laser beam power is in optimal condition. FIG. 2(*b*) shows a waveform of the error output from the error detection amplifier 25 and the error output changes around the average value (ground value) corresponding to the changes of the recording laser beam power shown in FIG. 2(*a*).

Figure 4:
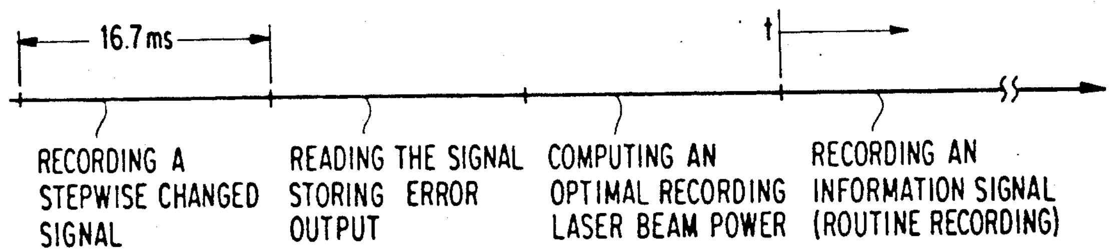
FIG. 4 shows an operation sequence for obtaining an optimal recording laser beam power according to the present invention.

In the system control section 12, the error data inputted via the input port 28 is picked up at the sampling timing of FIG. 2(*c*) under the control of the CPU 29, and stored in another memory area of the RAM 18. After the error data for the one track has been stored in the RAM 18, the CPU 29 starts the computation operation to obtain a optimal recording laser beam power. The CPU 29 computes optimal power data which makes error data zero by the least squares method or the like, based on the seven power data and the seven error data stored in the RAM 18, and outputs the computed optimal power data to the output port 19. At the same time, the computed optimal power data is stored in the RAM 18 as the initial data to be updated. Then, based on the computed optimal power data sent to the output port 19, the routine recording operation starts to record information. FIG. 4 shows the sequence of the operations.

When the optimal power data is not obtained, the system control section 12 increases or decreases the initial data by an amount corresponding to four steps (equivalent to 1.6 mW) to form again power data having seven steps and records a modulation signal which is level-modified by the power data on the same track to repeat the operation for obtaining the optimal recording laser beam power. In this embodiment, in addition to the optical head 2, there is provided another optical head 30 at a position apart from the head 2 by 90 degrees so that erasing operation can be performed simultaneously with the recording/reproducing operation. The optical head 2 is returned to the starting point of the track after the optimal recording laser beam power has been obtained, and the routine recording operation with the obtained optimal power starts.

On the magnetooptic disc 1, the recording track is arranged from the inner side to outer side in spiral form and, thus, the recording position shifts from the inner side to the outer side. Further, the optimal recording laser beam power obtained by the optimization process is the optimal level for the position where the recording operation starts. Therefore, as the recording operation proceeds over a plurality of tracks, the recording position shifts from the start track to another track positioned at more outer side on the disc and the recording laser beam power which was set as optimal at the beginning becomes not necessarily optimal any more. In other words, as the magnetooptic disc rotates at a predetermined rate, the line velocity at a recording position changes due to the change in radial distance. Thus, as the recording position moves outward of the disc, a greater recording laser beam power becomes necessary. The present invention automatically corrects or compensates for an optimal recording laser beam power as the recording position shifts outward.

Figure 5:
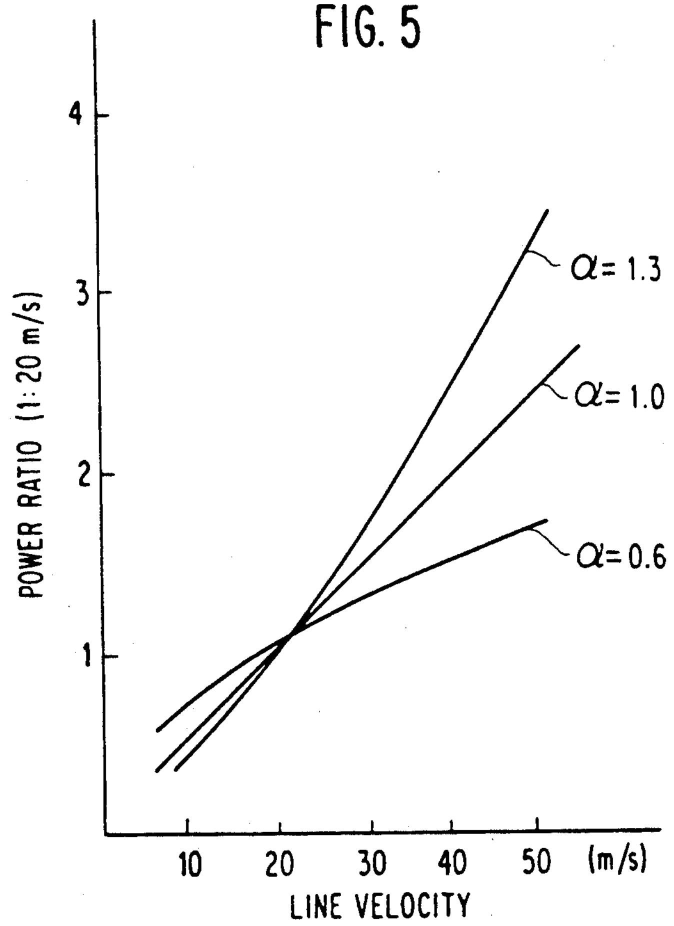
FIG. 5 shows examples of characteristic curves showing relation between line velocity and a necessary recording laser beam power.

Referring back to FIG. 1, as the recording operation continues, the position of the optical head 2 shifts, and a position sensor 31 outputs the position data thereof. The position sensor 31 comprises, for example, a linear encoder which measures the radial distance of the optical head 2 from the center, and a counter which outputs the positional data corresponding to the output from the linear encoder. The output from the position sensor 31 is fed to a correction data converter 32 to be converted into prescribed correction data corresponding to the head position, which in turn is added to the output from the output port 19 by the adder 20. The correction data will now be described. The optimal recording laser beam power is known to be proportionate to the line velocity raised to the power of $\alpha$. $\alpha$ varies in the range from 0.6 to 1.3 depending on the types of the disc. FIG. 5 shows characteristic curves of line veclcity (or radial distance at the recording position) VS. necessary recording laser beam power wherein $\alpha$ is assumed to be 0.6, 1 and 1.3, respectively. The correction data converter 32 generates correction data which is determinable in advance by the type of disc used, and comprises a read only memory (ROM) or the like which facilitates storing of correction data corresponding to plural $\alpha$s.

Figure 6:
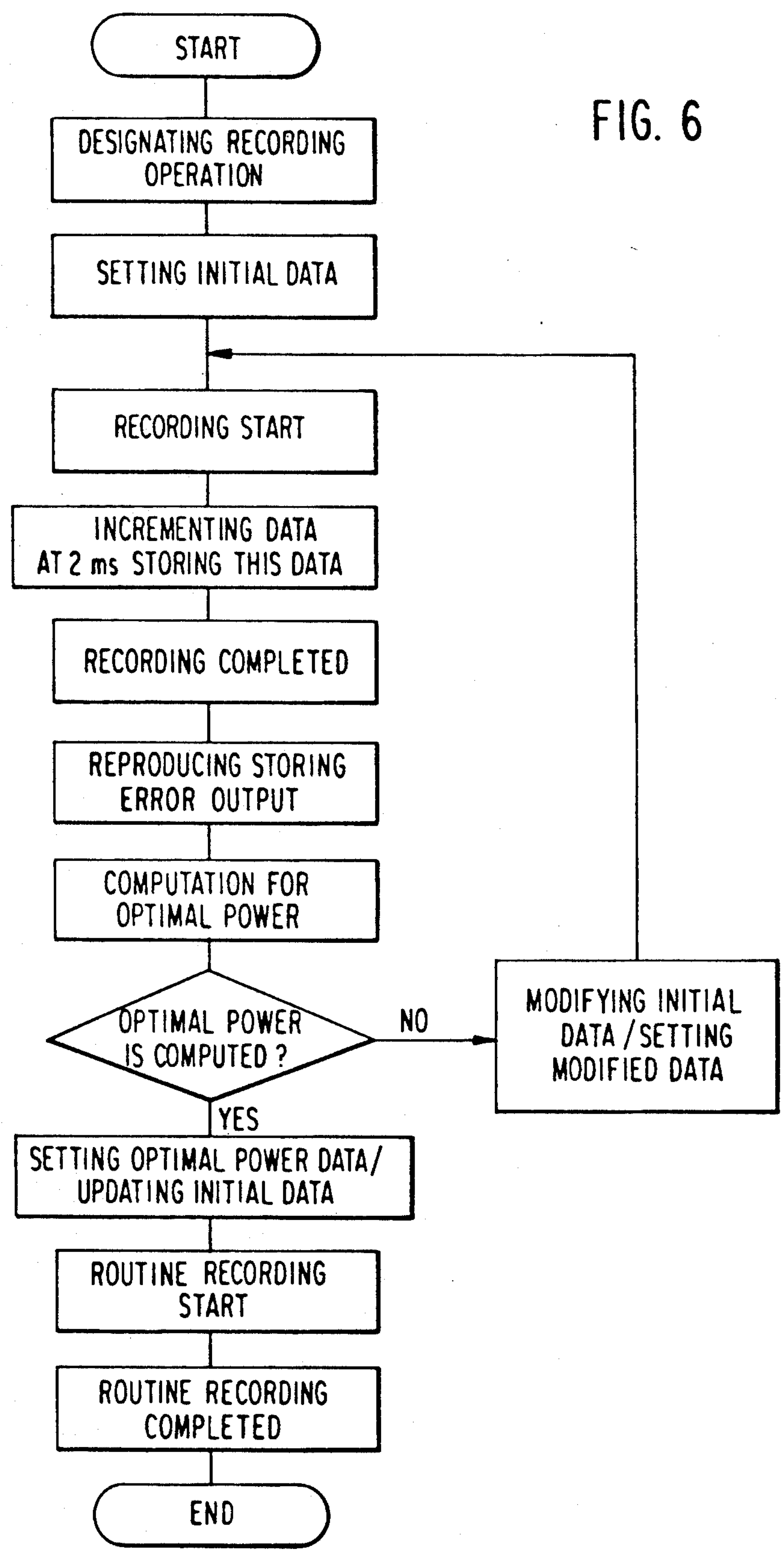
FIG. 6 is a flow chart to show the processing flow to obtain an optimal recording laser beam power according to the present invention.

In the system control section 12 shown in FIG. 1, the ROM 33 further stores a control program for the magnetooptic recording/reproducing apparatus and the operation proceeds in accordance with the program under the commands from the controller 13. FIG. 6 is a flow chart showing the processing steps for obtaining the optimal power of the recording laser beam.

As described in the foregoing, according to the present invention, a magnetooptic recording/reproducing apparatus having a simple structure and capable of optimally recording can be provided by using a test recording signal having a stepwise changed recording power to obtain an optimal recording laser beam power and by correcting or compensating the optimal recording laser beam power according to outward shift of an optical head. Accordingly, the present invention can precisely control a recording laser beam power adaptively to change in the recording position on the disc and change in recording sensitivity of a magnetooptic recording disc and, thus, can maintain an optimal recording condition, and a low error rate.

What is claimed is:

1. An optical recording/reproducing apparatus which records or reproduces information by a laser beam onto or from an optical recording medium, comprising:

optical head means including a laser diode for emitting said laser beam;

means for generating a predetermined recording signal, said predetermined recording signal being recorded on said optical recording medium for a predetermined period;

means for reading out said predetermined recording signal from said optical recording medium for said predetermined period;

means coupled to said generating means and said reading-out means for computing an optimal power level of said laser beam for recording at a first position of said optical recording medium, said optimal power level producing an optimal pit state on said optical recording medium at said first position;

means for detecting a further position of said optical head where recording is performed to produce a recording position signal when said recording on said optical recording medium becomes shifted from said first position;

means responsive to said detecting means for changing said optimal power level in response to said recording position signal to produce a changed optimal power level, said changed optimal power level producing an optimal pit state on said optical recording medium at said further position; and means for controlling a power of said laser beam in response to said changed optimal power level, wherein recording is performed by utilizing said laser beam power-controlled by said controlling means.

2. An optical recording/reproducing apparatus as claimed in claim 1, wherein said predetermined recording signal has a plurality of amplitudes time-sequentially changed for said predetermined period, and said computing means includes:

means for producing power data representing respective amplitudes contained in said predetermined recording signal;

means responsive to a reproduced signal delivered from said reading-out means for evaluating recorded pit states formed on said optical recording medium corresponding to said respective amplitudes contained in said predetermined recording signal to produce evaluated data associated with said respective amplitudes; and means for calculating said optimal power level in response to said power data and said evaluated data.

3. An optical recording/reproducing apparatus as claimed in claim 1, wherein said power controlling means controls said power in proportion to a line velocity at a recording position on said optical recording medium.

4. An optical recording/reproducing apparatus as claimed in claim 2, further comprising means for modifying said predetermined recording signal to have a different plurality of amplitudes when said computing means cannot compute an optical power level.

5. A method for optimizing a recording laser beam power in a magnetooptic recording/reproducing apparatus comprising:

forming a recording signal having a stepwise changed shape, said recording signal having plural amplitudes;

recording said recording signal on a track of a magnetooptic disc;

obtaining a reproduced signal by reading out the recording signal recorded on said track of said disc;

receiving said reproduced signal and obtaining an evaluation signal for each amplitude contained in said recording signal;

arithmetically calculating an optimal value of said recording laser beam power for said track based on said evaluation signal; and supplying said optimal value of said recording laser beam power to an optical head to effect a routine recording operation.

6. The method as claimed in claim 8, further including a step of modifying said recording signal to have a different stepwise changed shape if said optimal value of said recording laser beam power is not obtained in said determining step.

7. The method as claimed in claim 5, wherein said recording signal used in said recording step is a test signal.

8. The method as claimed in claim 5, further including a step of determining whether said arithmetically calculating step generated said optimal value of said recording laser beam power.

9. The method as claimed in claim 5, further including a step of erasing said recorded signal from said magnetooptic disc after said recorded signal is read out from said track of said disc.

10. The method as claimed in claim 5, further including the steps of:

correcting said optimal value of said recording laser beam power in accordance with a change in recording position to obtain a changed optimal value of said recording laser beam power; and performing the routine recording operation by utilizing said corrected optimal value of said recording laser beam power.

11. An optical recording/reproducing apparatus as claimed in claim 1, further comprising an erasing means for erasing information recorded on said optical recording medium after said predetermined recording signal is read out during the computing of said optimal power level by said computing means.

12. An optical recording/reproducing apparatus which records or reproduces information by a laser beam onto or from an optical recording medium, comprising:

optical head means including a laser diode for emitting said laser beam at a given power level;

means for generating a recording signal having a plurality of amplitudes stepwise changed, said recording signal being recorded as a recorded signal from a first position on said optical recording medium for a predetermined period;

means for producing power data corresponding to respective amplitudes contained in said recording signal;

means for reading out the recorded signal from said optical recording medium for said predetermined period to produce a reproduced signal;

means responsive to said reproduced signal for evaluating recorded pit states formed on said optical recording medium corresponding to said respective amplitudes contained in said recording signal and for producing evaluated data corresponding to said respective amplitudes; and means for calculating an optimal value for said power level in response to said power data and said evaluated data, said optimal power level value being used as the power level during routine recording on said recording medium.

* * * * *